United States Patent [19]

Monson

[11] Patent Number: 5,757,640
[45] Date of Patent: May 26, 1998

[54] PRODUCT APPLICATION CONTROL WITH DISTRIBUTED PROCESS MANAGER FOR USE ON VEHICLES

[75] Inventor: Robert J. Monson, St. Paul, Minn.

[73] Assignee: Ag-Chem Equipment Co., Inc., Minnetonka, Minn.

[21] Appl. No.: 590,933

[22] Filed: Jan. 24, 1996

[51] Int. Cl.⁶ .................................................. G05B 15/00
[52] U.S. Cl. ...................... 364/131; 364/138; 701/50; 701/1
[58] Field of Search ................... 364/131–139, 364/423.098, 424.034, 424.036, 424.038, 424.04, 424.07; 111/922; 172/315; 180/900; 395/904, 905

[56] References Cited

U.S. PATENT DOCUMENTS

| | | | |
|---|---|---|---|
| 4,015,366 | 4/1977 | Hall, III | 47/1 R |
| 4,176,395 | 11/1979 | Evelyn-Veere et al. | 364/420 |
| 4,209,131 | 6/1980 | Barash et al. | 239/68 |
| 4,277,022 | 7/1981 | Holdsworth et al. | 239/7 |
| 4,350,293 | 9/1982 | Lestradet | 239/155 |
| 4,392,611 | 7/1983 | Bachman et al. | 239/74 |
| 4,527,353 | 7/1985 | Newby | 47/59 |
| 4,545,396 | 10/1985 | Miller et al. | 137/78.3 |
| 4,553,702 | 11/1985 | Coffee et al. | 239/690 |
| 4,588,127 | 5/1986 | Ehrat | 239/156 |
| 4,630,773 | 12/1986 | Ortlip | 239/1 |
| 4,714,196 | 12/1987 | McEachern et al. | 239/62 |
| 4,721,245 | 1/1988 | van Zweeden | 239/10 |
| 4,755,942 | 7/1988 | Gardner et al. | 364/420 |
| 4,803,626 | 2/1989 | Bachman et al. | 364/424.07 |
| 4,805,088 | 2/1989 | Cross et al. | 364/172 |
| 4,823,268 | 4/1989 | Giles et al. | 364/424.07 |
| 4,895,303 | 1/1990 | Freyvogel | 239/61 |
| 4,925,096 | 5/1990 | Gill | 239/10 |
| 4,967,957 | 11/1990 | Bachman | 239/62 |
| 4,992,942 | 2/1991 | Bauerle et al. | 364/420 |
| 5,014,914 | 5/1991 | Wallenås | 239/62 |
| 5,021,939 | 6/1991 | Pulgiese | 364/143 |
| 5,077,653 | 12/1991 | Barlet | 364/167.01 |
| 5,170,820 | 12/1992 | Jones | 137/899 |
| 5,184,420 | 2/1993 | Papadopoulos et al. | 47/62 |
| 5,220,876 | 6/1993 | Monson et al. | 111/130 |
| 5,246,164 | 9/1993 | McCann et al. | 239/11 |
| 5,260,875 | 11/1993 | Tofte et al. | 364/424.07 |
| 5,313,578 | 5/1994 | Handorf | 395/200 |
| 5,355,815 | 10/1994 | Monson | 111/200 |
| 5,453,924 | 9/1995 | Monson et al. | 364/131 |
| 5,463,735 | 10/1995 | Pascucci et al. | 395/200.1 |

OTHER PUBLICATIONS

"Resource Allocation in a Flexible Manufacturing System by Graph Matching", by Shen et al., Proceedings of the 1991 IEEE International Conference on Robotics and Automation, Apr. 1991, pp. 1315–1320.

"Data Transfer Bottlenecks over SPARC–Based Computer Networks", by E. Saulnier and B. Bortscheller, IEEE Local Computer Networks, 1995 20th Conference, pp. 289–295.

"An Efficient Recovery Protocol for Distributed Network Planning Information with Network Partitoning and Equipment Failure", by Farnham et al., Globecom '95 Communications for Global Harmony, IEEE Global Telecommunications, May 1995, pp. 952–957.

*Primary Examiner*—Jacques H. Louis-Jacques
*Assistant Examiner*—Russell W. Frejd

[57] ABSTRACT

A product application control system having at least one distributed network. Each distributed network includes at least one independent control module for controlling at least one activator device. The system includes a central processor which has a process distribution controller which monitors the level of processing activity of the central processor. The responsibility for processing objects is maintained in the central processor so long as the level of processing activity in the central processor does not exceed a predetermined target level. If the target level is exceeded the process distribution controller causes responsibility for processing one or more objects to be downloaded to at least one independent control module.

15 Claims, 9 Drawing Sheets

PRODUCT APPLICATION CONTROL WITH DISTRIBUTED PROCESS MANAGER FOR USE ON VEHICLES

FIELD OF THE INVENTION

This invention relates to product application control systems. More particularly, this invention relates to a modular expandable product application control system having a distributed process manager using one or more distributed networks for use on vehicles either self-propelled or towed.

BACKGROUND OF THE INVENTION

Present mobile product application control systems are generally designed for simple closed loop control of a multiple loop network or are otherwise directed generally toward a single open loop distributed network. At present, the maximum amount of loops that can be added to a multiple closed loop network typically would approach ten. Beyond this value, the overall packet structure and network control would become cumbersome, requiring significant redesign of the overall closed loop system.

A typical closed loop system is laid out with a host controller located within the cab of a vehicle, made up of a processor with associated input and output devices. This host controller is typically directly linked to a second controller located within the cab, which is responsible for all communication to devices on the chassis of the vehicle. Such a system is shown in U.S. Pat. No. 4,630,773 to Ortlip, issued Dec. 23, 1986 entitled "Method and Apparatus for Spreading Fertilizer." Another system is shown in U.S. Pat. No. 5,220,876 to Monson et al., issued Jun. 23, 1993 entitled "Variable Rate Application System" and assigned to the assignee of the present invention. Both the '773 patent and the '876 are incorporated herein by reference in their entirety.

In closed loop systems such as those stated above, the addition of loops as a result of further control requirements adds great complexity to the system wiring. This results in a realistic limit to the amount of loops that can be added to a single system. Beyond this limit, the amount of wiring becomes too great and routing the wiring is a considerable challenge. At present, it is felt that ten loops is the approximate limit for a single host system for the type described above.

Software construction also places many constraints on the design and application of a control system. The common top down design has certain flow characteristics that define a specific flow path within the operating system. This also limits the effective amount of devices that can be controlled with a single system, as eventually the communication link to the devices becomes the limiting factor.

The aforementioned software construction implies that any changes in the requirements, such as the inclusion of an additional loop on the vehicle, often causes sweeping changes within the code. This also has obvious trickle-down effects that are not desired within the flow structure of the program.

Thus, debugging and testing become required parts of the system maintenance, requiring large amounts of capital and time to assure a simple change has not caused greater errors elsewhere in the system (often occurring in totally unrelated places).

One solution to the many problems stated herein before was addressed in U.S. Pat. No. 5,453,924, to Monson et al., issued Sep. 26, 1995, entitled "Mobile Control System Responsive to Land Area Maps", and assigned to the assignee of the present invention. The '924 patent is incorporated by reference in its entirety herein. The inventive system disclosed and claimed by Monson et al. in the '924 patent effectively eliminated the requirement for multiple closed loops by utilizing a single open loop distributed network. This was accomplished with the use of modern hardware and software capabilities. In particular, the system utilized object oriented software design as well as windows interfacing, distributed network controls and Echelon LonWorks network technology.

For the aforementioned reasons, it becomes immediately apparent that existing closed loop product application control system designs are by no means desirable, and entirely new approaches are required. While the solution provided by Monson et al. in the '924 patent addressed many of the problems associated with closed loop product application control systems, a need still exists for a system architecture which, to a great extent, is independent of the media and network protocol utilized. The present invention described in detail hereinafter offers an additional solution to the stated problems.

SUMMARY OF THE INVENTION

The present inventive product application control system provides a novel method and apparatus which overcomes many of the shortcomings and attendant disadvantages of past control systems utilized by the agronomics industry. Several problems are considered unavoidable within the industry, some of which have been discussed previously. The present invention, however, overcomes many of these problems with a new approach to controls design.

Object-oriented design was developed within the software industry to create a system capable of expansion or retraction with very little effect on the system as a whole. The present invention utilizes this principle in a manner previously unknown or contemplated by those skilled in the art. Instead of expanding on the use of a single distributed network system, as known in the art, the present invention expands the control system into a multiple distributed network system, with any expansion having only a transparent effect on the system as a whole. As stated previously, this has been accomplished through the use of several state-of-the-art technologies including the aforementioned object-oriented software design, as well as windows interfacing, distributed network controls and modern network technology, e.g., Echelon™ LonWorks™ or CANs network technology.

Object-oriented software design is critical in an ever changing system such as that displayed by the present invention. With the use of objects, the software is translated from a top-down flowchart into a dynamic system that reacts to the world around it, in much the same manner one would expect the control system to operate. This is accomplished with a message-based system such as the windows interface which increases usability, but also allows a new approach to task completion.

The objects are designed in a fashion that allows ease of expansion and upgradability, easing maintenance in the future. Because of the packaging of objects, the trickle-down effect is removed from the system when upgrades are incorporated. Thus, the flow of the system is not so completely interrelated, and a change in one area will not cause unexpected problems elsewhere, as was the case in past closed loop systems.

The aforementioned inventive control system also greatly simplifies system testing since only the area of interest need be tested. Because the actual flow path of other areas is not disturbed in any way, it is not necessary to perform redundant and excessively costly testing of the complete system. Thus, system testing becomes an option and not a necessity.

Distributed network controls were selected for the present inventive system for much the same reason as object-oriented software. Use of a distributed network is intended to create the simplest method of network expansion or retraction without excessively burdening the system with overhead costs. In other words, with a standard closed loop system, it is easy to include ten control loops on every machine in order to create a common fleet of vehicles. Unfortunately, this means unnecessary costs are incurred on vehicles requiring only one loop. Thus, a distributed network control system has been developed which only allows required hardware as necessary components.

The control system design allows ease of expansion as discussed previously, but also brings a great enhancement in the area of manufacture. The present invention further incorporates a single cable which is run into the cab for each distinct network which is embodied on the vehicle. Each cable preferably contains a twisted pair of wires through which the network communicates with the host and a second pair to twisted wires providing power to the network. All other network wiring is external to the cab, itself, a great improvement over existing systems. Thus, the majority of the wiring has been removed beyond the cab to the location of the actuation and sensing. This means that complex, machine dependent wiring occurs only at the actuator or point of sensing and in a modular fashion.

Proper development of a multiple distributed network, also allows the node hardware to be identical from node to node, which implies that each machine control system is identical, with the only differences being in the number of nodes and the machine dependent wiring such as that displayed by the present invention.

Placing the node control at the location of the actuator reduces 1) attenuation of the signal, 2) the incorporation of noise 3) the packaging of loop-dependent controllers, and 4) continuation of the signal. Thus, the intelligence of the controllers is distributed throughout the vehicle. This also allows a great enhancement of the associated diagnostic system. With the control loop separated, and each node capable of self-sustained control, each loop can also be responsible for diagnostics, data-logging, communication and even the real generation of expert systems, if so desired, thereby allowing the main processor to simultaneously orchestrate command processing and control of more than a single distributed network.

The present inventive system additionally incorporates intelligent network technology such as Echelon™ Lon-Works™ technology or CANs technology to support the aforementioned benefits. The system is capable of incorporating multiple intelligent networks. For example, the control system may include a product application control network, a vehicle location sensing network, a chassis control network and/or a product development sensing network for providing data relating to plant development. Each of the networks is capable of operation independently of the others. Further, each distributed network may communicate with the host using its own communication technology independent of that used by the other networks. This allows the use of Echelon™ LonWorks™ or CANs network technology, for example, which may be developed in the future.

In one embodiment the invention is a mobile product application control system which includes a vehicle and at least one distributed network coupled to the vehicle. The distributed network includes at least one independent control module located at a node within the distributed network and having independent processing capability. The intelligent control module controls at least one actuator device in response to control setpoints generated from objects processed within the control system. The actuators are controlled in a manner that causes at least one predetermined product to be applied to a predetermined geographic land area at variable rates determined by the control setpoints. The system includes a central processor coupled to the at least one distributed network. The central processor has a process distribution controller which monitors the level of processing activity of the central processor. It is the process distribution controller which determines whether objects are processed within the central processor or the independent control modules. The responsibility for processing objects in maintained within the central processor so long as the level of processing activity in the central processor does not exceed a predetermined target level. If that predetermined target level is exceeded the process distribution controller causes the responsibility for processing one or more objects to be downloaded to at least one independent control module. The objects are downloaded based upon a predetermined priority level. Preferably, objects with the lowest priority are downloaded first. The system further includes at least one data input device coupled to either the distributed network or the central processor. The data in used in processing the objects.

The independent networks may include a product application control network, a vehicle location sensing network, a chassis control network or a product developments sensing network. Further, the system of the present invention may be used in a way that provides a totally hands-free control system where independent control modules control actuators responsible for product application, vehicle speed, vehicle gear ratio and vehicle steering. Thus, operator involvement in hands-on control is kept to a minimum.

In a further embodiment the invention is a method of controlling application of a product to a predetermined geographic land area. The method comprises providing a vehicle having at least one input actuator device, a central processor and at least one independent sensing and control module. The vehicle is caused to travel over the surface of the geographic land area. Objects are processed within the control system to determine control setpoints. The objects are processed within the central processor so long as the level of processing activity in the central processor does not exceed a predetermined target level. If the predetermined target level is exceeded the responsibility for processing at least one object is downloaded to at least one independent processing and control module. The at lest one actuator device is controlled in response to the control setpoints generated from the objects processed within the control system such that at least one predetermined product is applied to the predetermined geographic land area at variable rates determined by the control setpoints. The method may include controlling actuators which control vehicle speed, vehicle gear ratio and vehicle steering based upon setpoints generated from the processed objects.

From the foregoing, it is clear the present inventive control system performance is greatly enhanced over existing systems. Other features of the present inventive product application control system include ease of use, manufacture, enhanced serviceability, maintainability, upgradability, and enhanced expansion and diagnostics capability.

BRIEF DESCRIPTION OF THE DRAWINGS

Other objects and features of the present invention and many of the attendant advantages of the present invention will be readily appreciated as the same become better understood by reference to the detailed description when considered in connection with the accompanying drawings in which like reference numerals designate like parts throughout the figures thereof and wherein.

DETAILED DESCRIPTION OF THE PREFERRED EMBODIMENTS

Background

Figure 1:
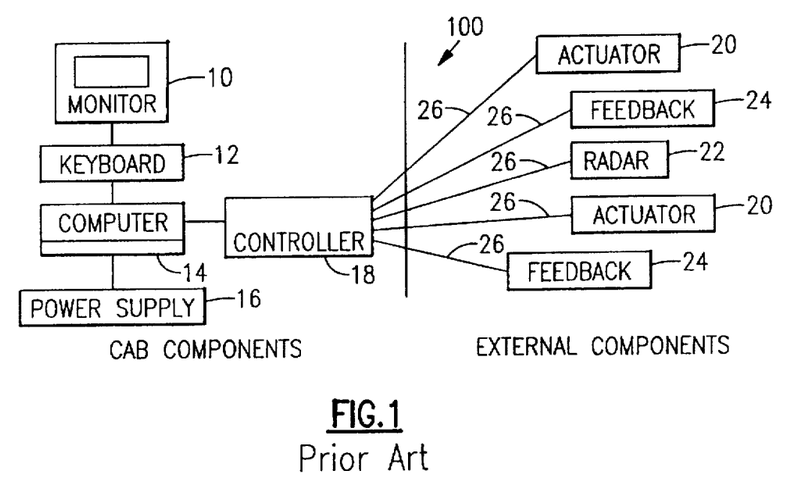
FIG. 1 is a simplified block diagram of a closed loop multiple loop control system for which reliance on processing resides entirely within a host, known to those skilled in the art.

Referring to FIG. 1, a presently known product application control system 100 includes a host controller 18 located within the cab of a vehicle (not shown), made up of a processor/computer 14 with associated input and output devices including monitor 10 and keyboard 12. The host controller 18 is responsible for all communication to devices such as actuators 20 including actuator feedback 24 to controller 18 and, for example, a radar device 22 on the chassis of the vehicle. As shown, and as previously discussed, the addition of loops 26 to the control requirements adds great complexity to the overall control system 100 wiring.

Figure 2:
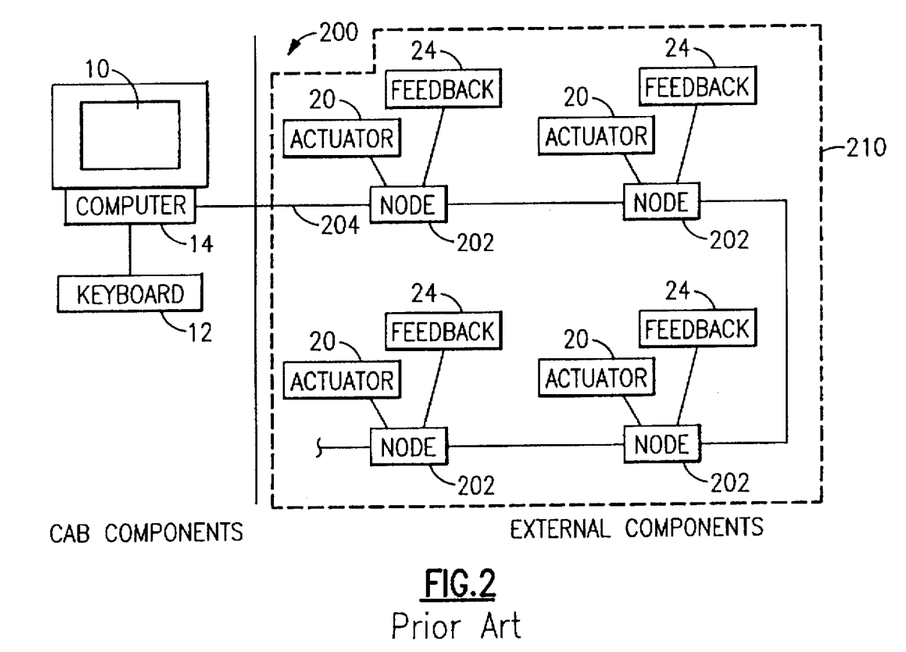
FIG. 2 is a simplified block diagram of a known distributed network control system wherein significant processing takes place in the nodes.

In FIG. 2, a known embodiment 200 for a product application control system similar to that described in the '924 patent to Monson et al. is shown. The system includes a processor/computer 14 with associated input and output devices including a monitor 10 and a keyboard 12, located within the cab of the vehicle (not shown). Computer 14 is connected to a single distributed network 210 via a single twisted pair of wires 204 which is run into the cab (not shown). All other system wiring is external to the cab.

The distributed network control system 200 includes multiple nodes 202, theoretically unlimited in number. It can thus be seen that the majority of the wiring displayed in the control system 100 illustrated in FIG. 1 has been moved beyond the cab to the location of the actuators 20 and sensing, feedback 24. It can be seen, therefore, as stated herein before and as specifically described in the '924 patent, that the complex common machine dependent wiring only occurs at the actuators 20 and in a modular fashion.

As stated herein before, node 202 hardware is generally identical from node 202 to node 202, thereby implying that each machine product application control system 200 is identical, with the only differences being in the number of nodes 202 and the machine (not shown) dependent wiring.

The Multiple Network Control System

Keeping in mind the known art described above, the present inventive product application control system will now be discussed in detail with the aid of FIGS. 3-12 and following definitions.

Object-Oriented Software—software development using the object-oriented methodology which models the problem domain as a collection of real-world objects, and translates these objects into executable program code in a manner that promotes reusability, maintainability, and extendibility, among others.

Windows Interface—a graphical user interface extension of an operating system, built upon a message-based multitasking system, as opposed to a classical system built on a single thread of execution.

Distributed Network—a hardware design methodology that takes advantage of network communications and applies them in the control domain.

Echelon™ LonWorks™ Technology—a hardware system that fully exploits the distributed network concept, and greatly eases the more complex communication requirements that are brought about by the use of distributed processors.

CANs Technology—yet another hardware system that fully exploits the distributed network concept, and greatly eases the more complex communication requirements that are brought about by the use of distributed processors.

The system architecture basically refers to the overall structure and method of accomplishing a task in the environment of the network. That is to say, that once the network is in place, there are many methods and data structures for achieving the same end. If the network use is properly structured, the system design will, to a great extent, become independent of the media and network protocol used. Although Echelon™ network technology is presently preferred, the same structure as present utilizing Echelon™ network technology would transpose almost directly into similar network environments, e.g., CANs technology. In other words, the present multiple network control system may be used with any existing or contemplated network technology.

Preferably, the design of the present inventive multiple network control system creates a reliance on processing in the node(s) 202, by virtue of requiring complete PID capabilities and self-diagnostics, and processing capability within the host, to provide commands at predetermined intervals, e.g., one second, to each of the operating loops. This clear separation of processing allows the present inventive system to be created with very little reliance on the communication method between the host and particular network nodes. As stated herein before, Echelon network technology simplifies this communication, but other network technology, e.g., CANs could also be used.

FIGS. 3–7 are simplified block diagrams showing a host connected to a single network. These figures illustrate some of the alternatives which exist for computing and data storage capabilities of the system. Although a single network is shown the alternatives are equally applicable to a multiple network system.

Figure 3:
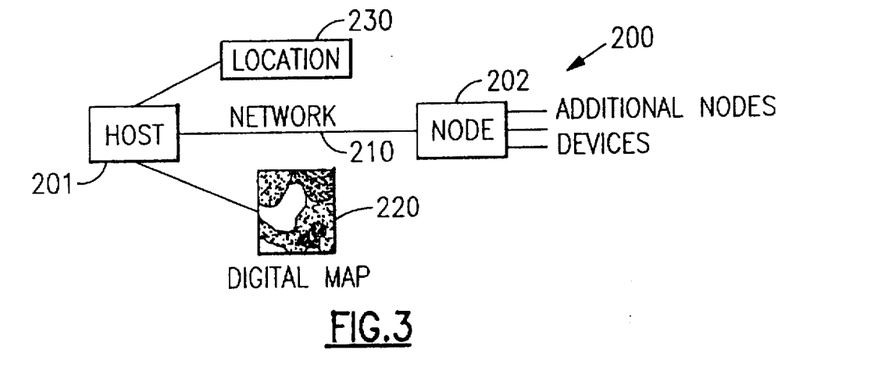
FIG. 3 illustrates a simplified depiction of the control system of FIG. 2, where map and GPS data structures typically reside in the host, and a network carries only setpoint information to the node(s).

FIG. 3 illustrates a simplified depiction of the control system 200 in FIG. 2, a known control system used in the agricultural industry for the application of agricultural products, where map 220 and GPS (global positioning system) 230 data structures typically reside in the host 201, and a network 210 carries only setpoint information to the node(s) 202. Each node may be connected to devices such as actuator 20 and feedback 24 as well as to additional nodes. Although control system 200 overcomes many of the attendant disadvantages inherent within known closed loop multiple loop control systems such as that illustrated in FIG. 1, it is clearly seen that such a system design continues to place a great burden on the host system. What is still needed within the agricultural industry as well as other industries which utilize self-propelled vehicle product application control systems, is even more flexibility to complete a desired task in several different manners with the same hardware, dependent only on the software and firmware (data structures) utilized. The present inventive control system will now be described in detail with reference to FIGS. 4–12.

Figure 4:
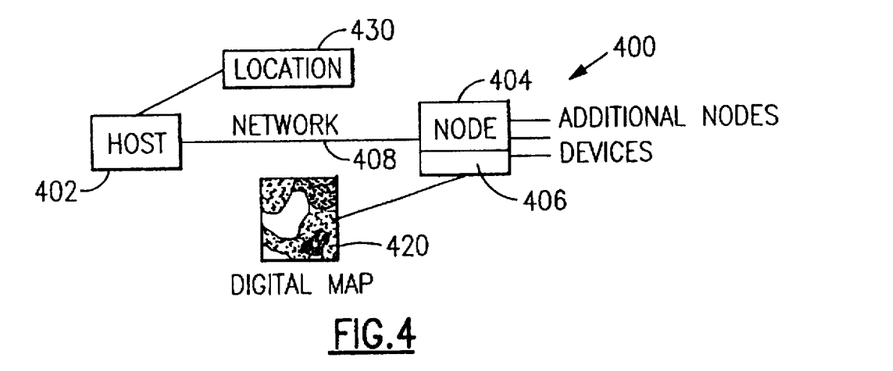
FIG. 4 is a simplified block diagram of one embodiment of a product application control system in accordance with the present invention where the GPS data structure(s) reside in a host, and map data structure(s) reside within the network node(s).

Referring to FIG. 4, one preferred embodiment 400 for the present inventive product application control system includes a host 402 with associated input and output devices (e.g., 12, 14 located within the cab of the vehicle). Embodiment 400 includes a nodal control module 406 located at each node 404. Placing a nodal control module 406 at the location of each actuator device 20 provides for downloading a digital description of a land area 420, for example, thereby making the nodes 404 more independent than nodes 202 utilized in prior known distributed network product application control systems for use in conjunction with self-propelled or towed vehicles. In this embodiment, location data 430 from a GPS system is the only information communicated on the network 408 (along with status data). Therefore, this embodiment requires a great deal of memory in the node(s) 404. Each node 404 has associated with it devices including, for example, an actuator 20 and feedback 24 as described with respect to FIG. 2.

Figure 5:
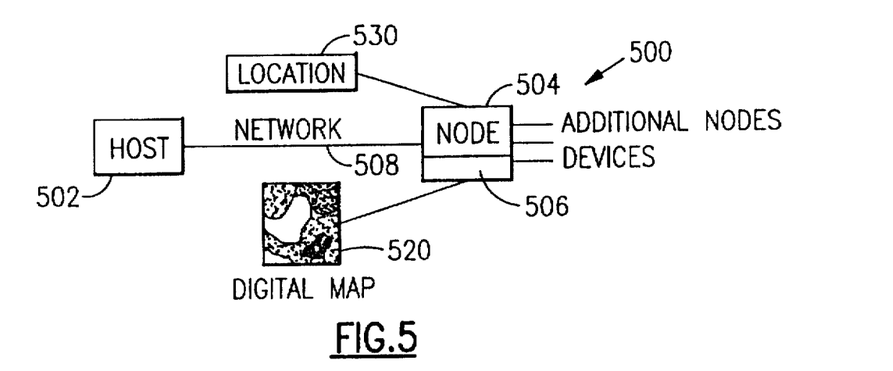
FIG. 5 is a simplified block diagram of another present product application control system, where the map data structure(s) and the GPS data structures reside entirely within the network node(s).

FIG. 5 is yet another preferred embodiment 500 for the present inventive product application control system. The system includes a host 502 with associated input and output devices, e.g., 12, 14 located within the cab of the vehicle. Embodiment 500 includes a nodal control module 506 located at each node 504. Each nodal control module 506 includes data structures at the location of each actuator device 20 which provide for downloading for both the map 520 and location data 530, for example, resulting in the host system 502 acting solely as a supervisor, with the nodes 504 acting in an autonomous fashion. It should be noted that GPS data 530 can be present on any node 504 within the network 508 with the same result. Such an embodiment of the present inventive control system requires the greatest processing capabilities for the nodes 504, as well as the greatest memory requirements.

Figure 6:
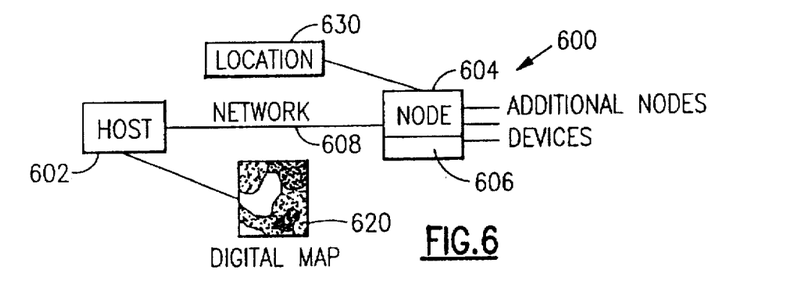
FIG. 6 is a simplified block diagram of yet another embodiment for the present product application control system, where the map data structure(s) reside in a host and the GPS data structure(s) reside entirely within the network node(s).

A further embodiment 600 of the present inventive product application control system is shown in FIG. 6. The product application control system includes a host 602 with associated input and output devices, e.g., 12, 14 located within the cab of the vehicle. Embodiment 600 includes a nodal control module 606 located at each node 604. Each nodal control module 606 includes data storage transfer structures at the location of each actuator device 20 which provide for downloading network based GPS signals 630, for example, in order to simplify the main host 602 design. Map data 620 is stored in the host. Typically, an extra serial port is required for such a GPS input for the control module 606. This embodiment 600 is preferred for any network capable system which does not increase processing power within the nodes 604. Although this embodiment would not increase the processing power for any particular node 604, it would require the node 604 to transmit its location to the host 602 before receiving a command setpoint. Thus, this embodiment 600 could be somewhat slower, and would increase the network traffic over that expected with other embodiments of the present inventive system described above.

Figure 7:
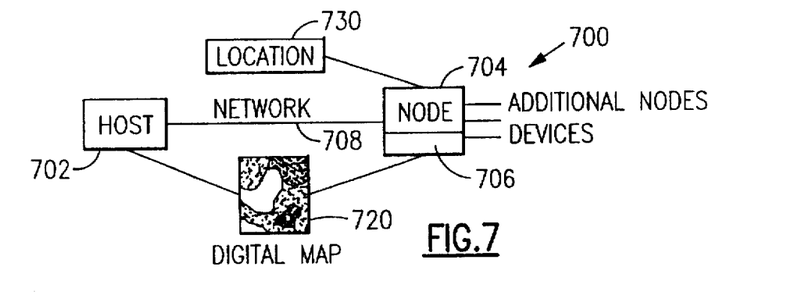
FIG. 7 is a simplified block diagram of another embodiment for the present product application control system, where the GPS data structure(s) reside entirely within the network node(s) and where the map data structure(s) reside in both a host as well as within the network node(s).

FIG. 7 shows a preferred embodiment 700 for distribution of data storage and computer capabilities for the present inventive control system. Embodiment 700 includes a nodal control module 706 located at each node 704. Each nodal control module 706 includes data storage and transfer structures at the location of each actuator device which provides for downloading network based GPS signals 730 similar to that described with respect to FIG. 6. In this embodiment map data storage and transfer structures reside in both a host 702 as well as within the network nodes 704. The distinction of embodiment 700 is, therefore, that map data 720, could reside to some extent in more than one location. As disclosed in U.S. Pat. No. 5,220,876 issued to Monson et al., there may be at least two maps present in the system. For example, one map may correspond to the digital description of the field and the other may describe how product application rates are related to the colors on the map. This can be a one dimensional map. In the case where the digital description of the field resides in the host, a look up table can reside in the node 704 with setpoint data. This results in network traffic being comprised of the host 702 telling the nodes 704 at what array location the machine is presently located. Embodiment 700 is advantageous in that communication in the network is minimized.

Figure 8:
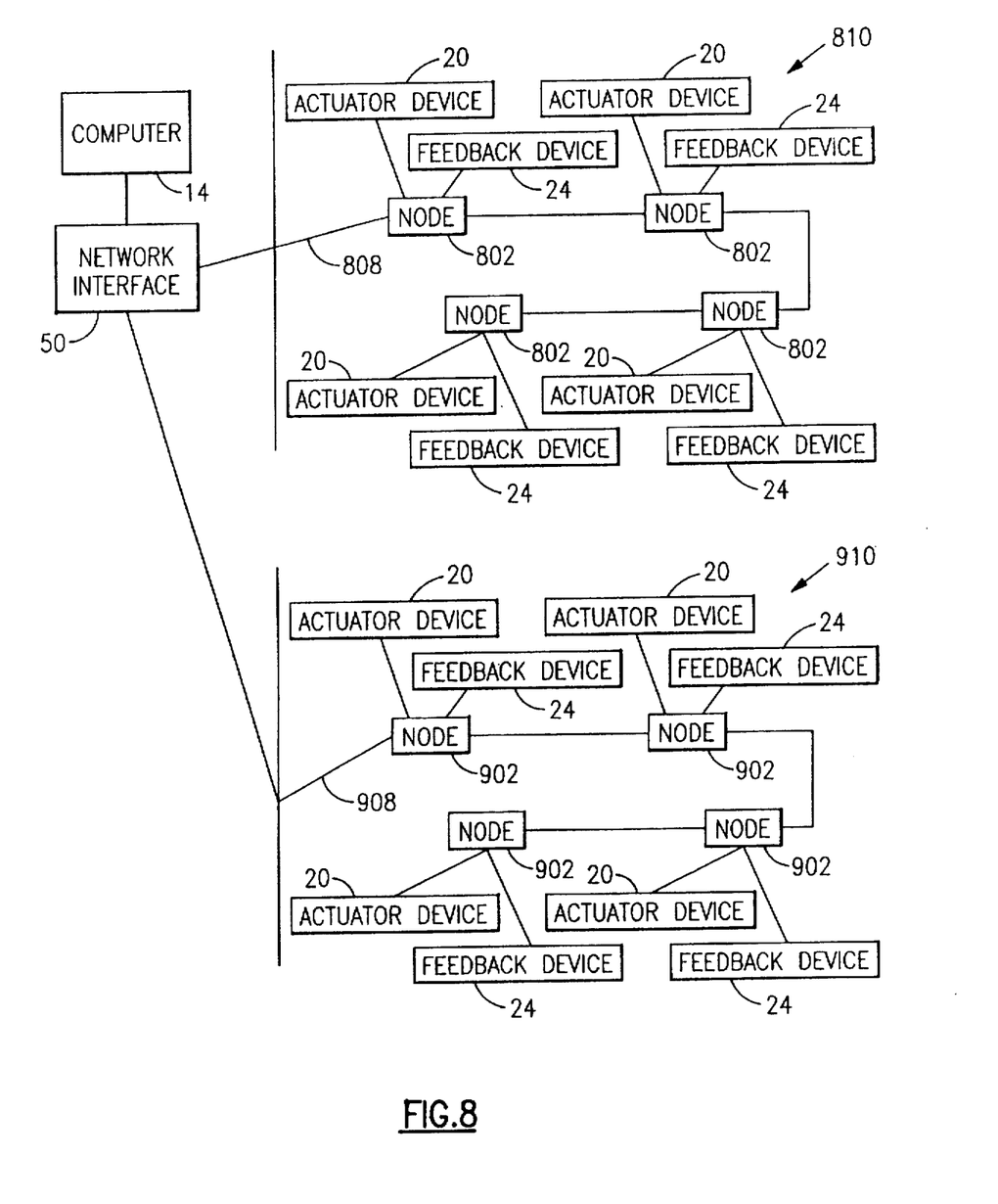
FIG. 8 is a simplified block diagram of a multiple network product application control system in accordance with the present invention.

One of the advantages of downloading data and control responsibilities to the nodes is that the host is then free from the task of performing nodal control functions. By freeing the host from time critical activities of the control system it is possible to create a system capable of running several control/status networks simultaneously on a vehicle. The host is thus capable of monitoring and serving several independent networks. Such a multiple network control system is shown in FIG. 8. The control system includes two or more independent networks 810 and 910. Networks 810 and 910 communicate with a processor/computer 14 having associated input and output devices, e.g., monitor 10 and a keyboard 12 (not shown) through a network interface 50. Network interface 50 communicates with distributed networks 810 and 910 via cables 808 and 908, respectively. Cables 808 and 908 each include a twisted pair of conductors for carrying network data between network interface 50 and independent distributed networks 810 and 910 but the present invention is not so limited and other communication cables or methods of communication, including wireless, may be used within the scope of the invention. Each distributed network requires only one cable per network to enter the cab for full operation of each network and all devices. This is a great simplification from the traditional layout where dozens of wires enter the cab. Thus, troubleshooting and maintenance are greatly simplified and the network has provided a method of self-diagnostics by design. Obviously, if feedback is not received at the node, the problem lies between the node and device, rather than somewhere between the controller and the device.

Expansion of either distributed network 810 or 910 is easily accomplished by simply extending the network to a new node and providing the necessary node/device wiring. This allows the design to be completed in a completely modular fashion as each network remains independent of the others.

Each distributed network 810 and 910 includes multiple nodes 802 and 902, respectively. Each of the nodes has associated with it at least one actuator 20 and, preferably, a feedback device 24, although it will be appreciated that feedback is not always necessary. Each of the nodes 802 and 902 has a node controller which functions in a manner similar to those described in connection with FIGS. 4-7.

Operation of the Control System

Figure 9:
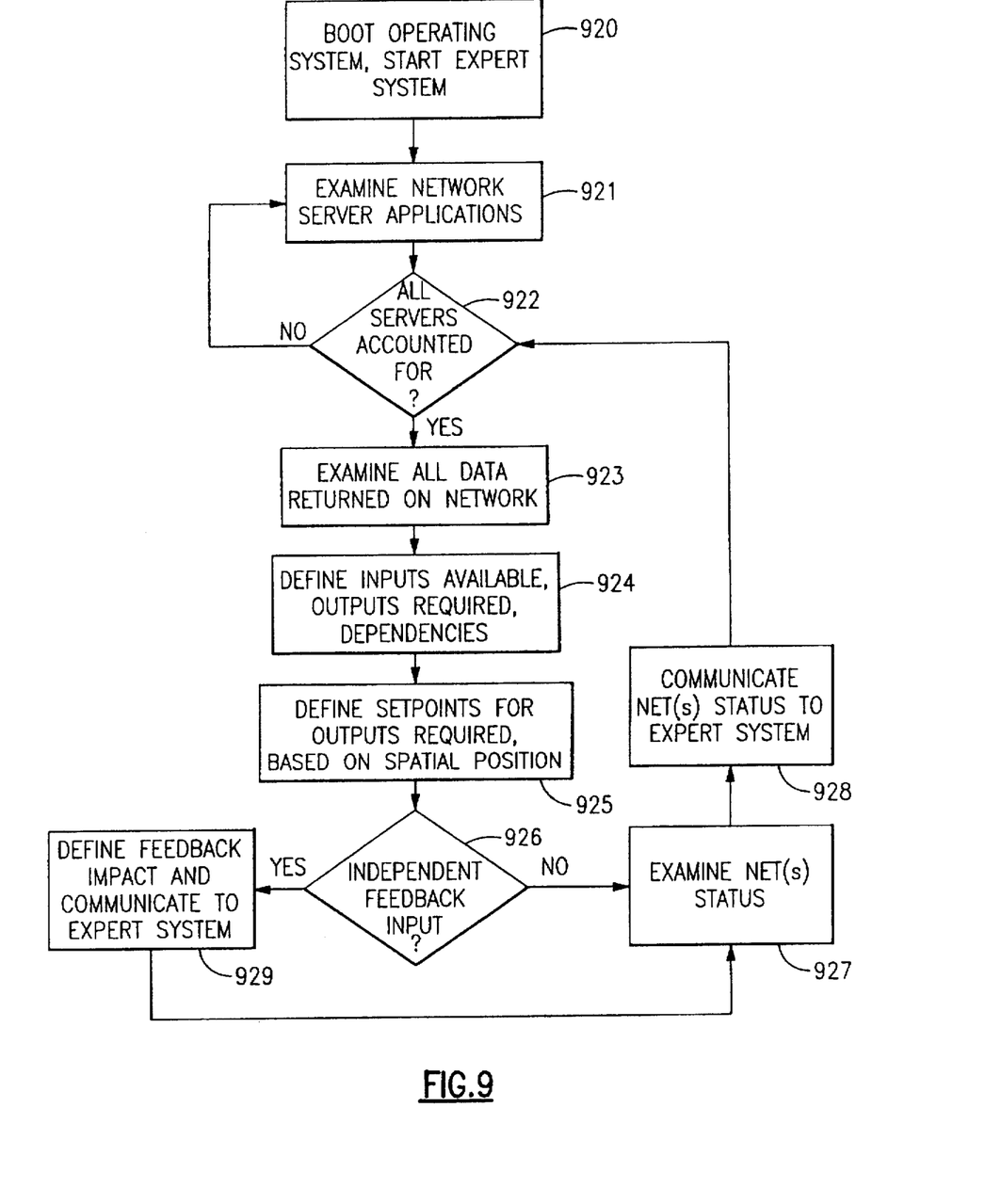
FIG. 9 is a flow diagram for the host system tasks for operating the present product application control system shown in FIG. 8.
Figure 10:
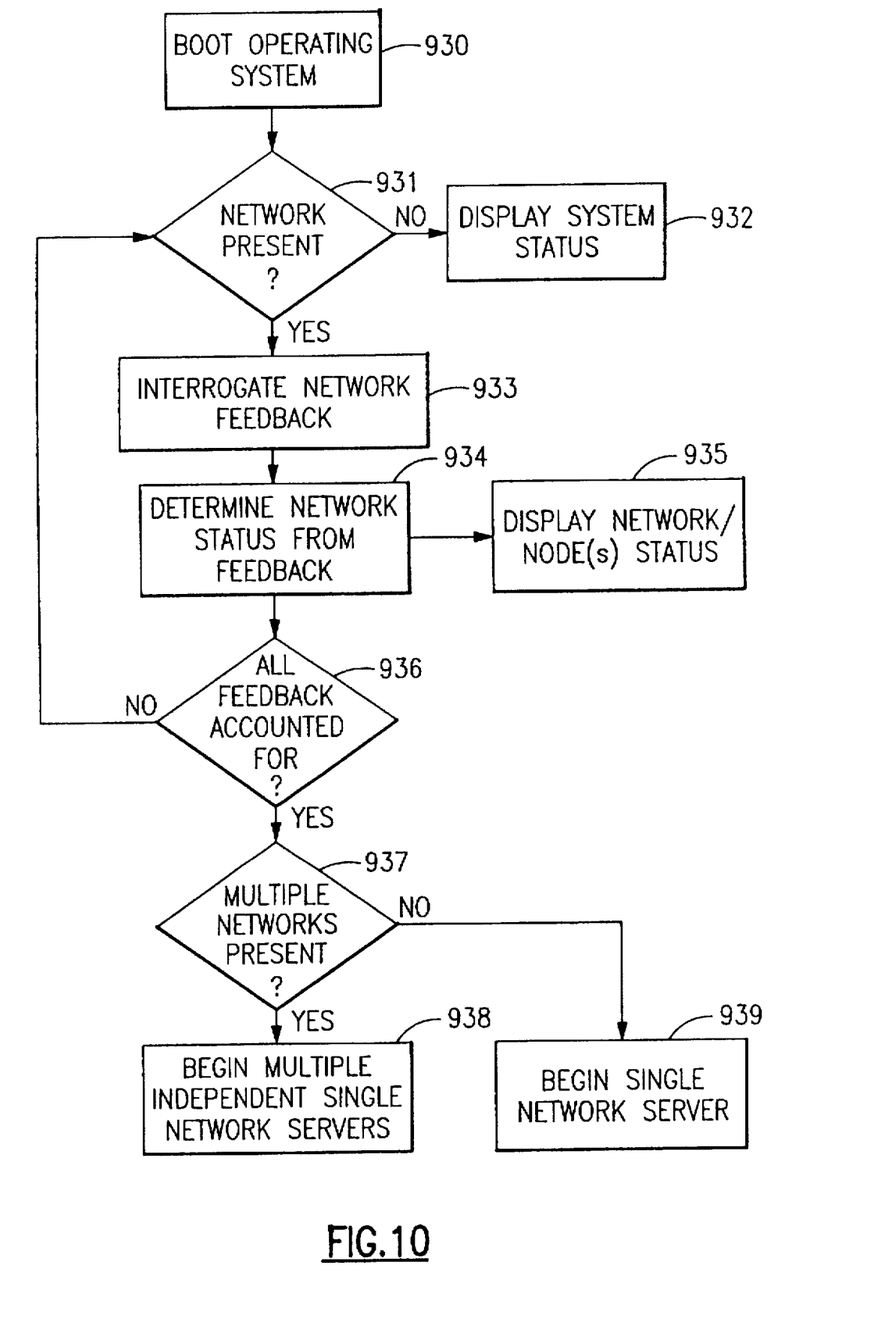
FIG. 10 is a flow diagram of a multiple network server start-up for operating the present product application control system shown in FIG. 8.
Figure 11:
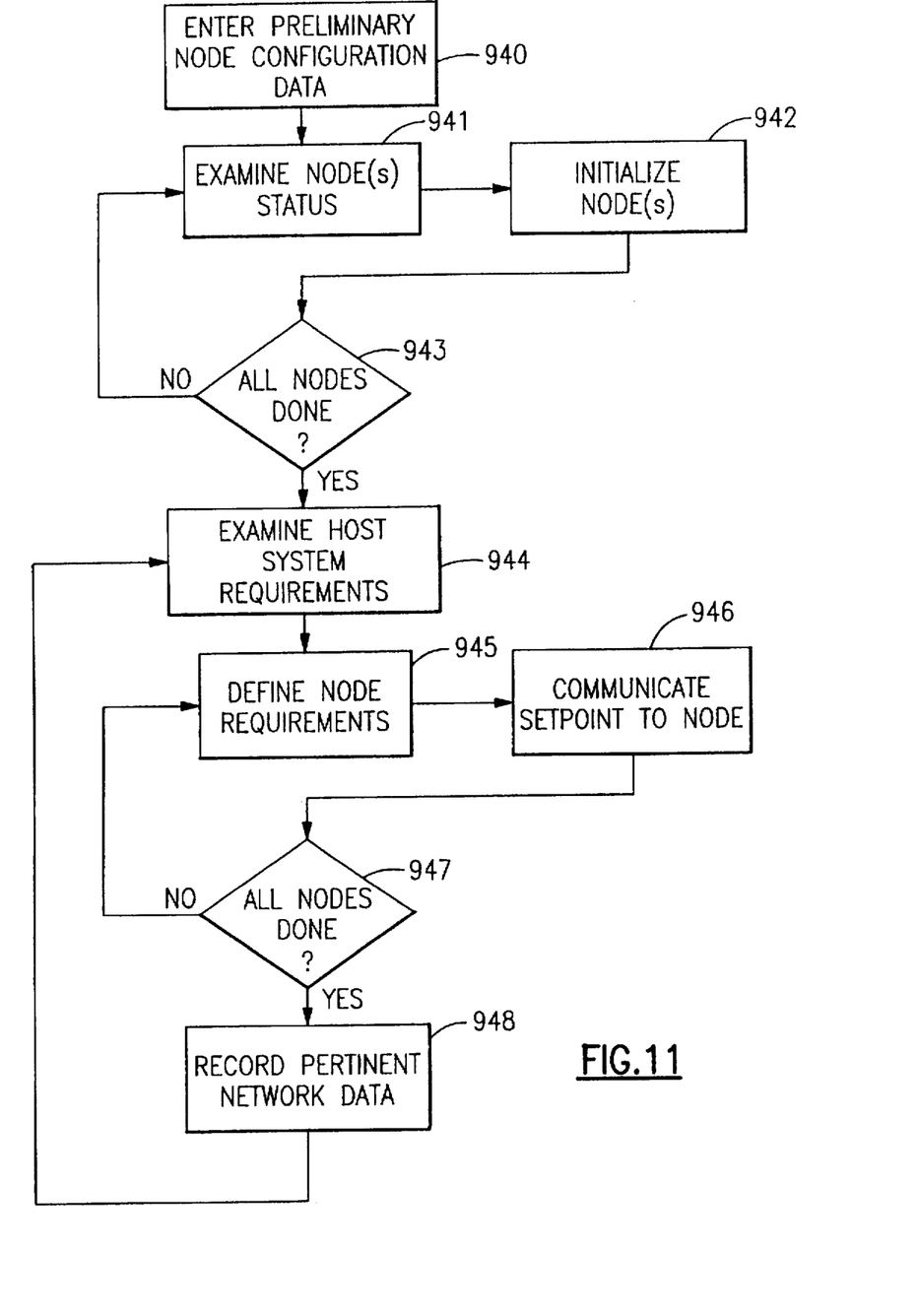
FIG. 11 is a flow diagram of a single network server for operating the present product application control system shown in FIG. 8.
Figure 12:
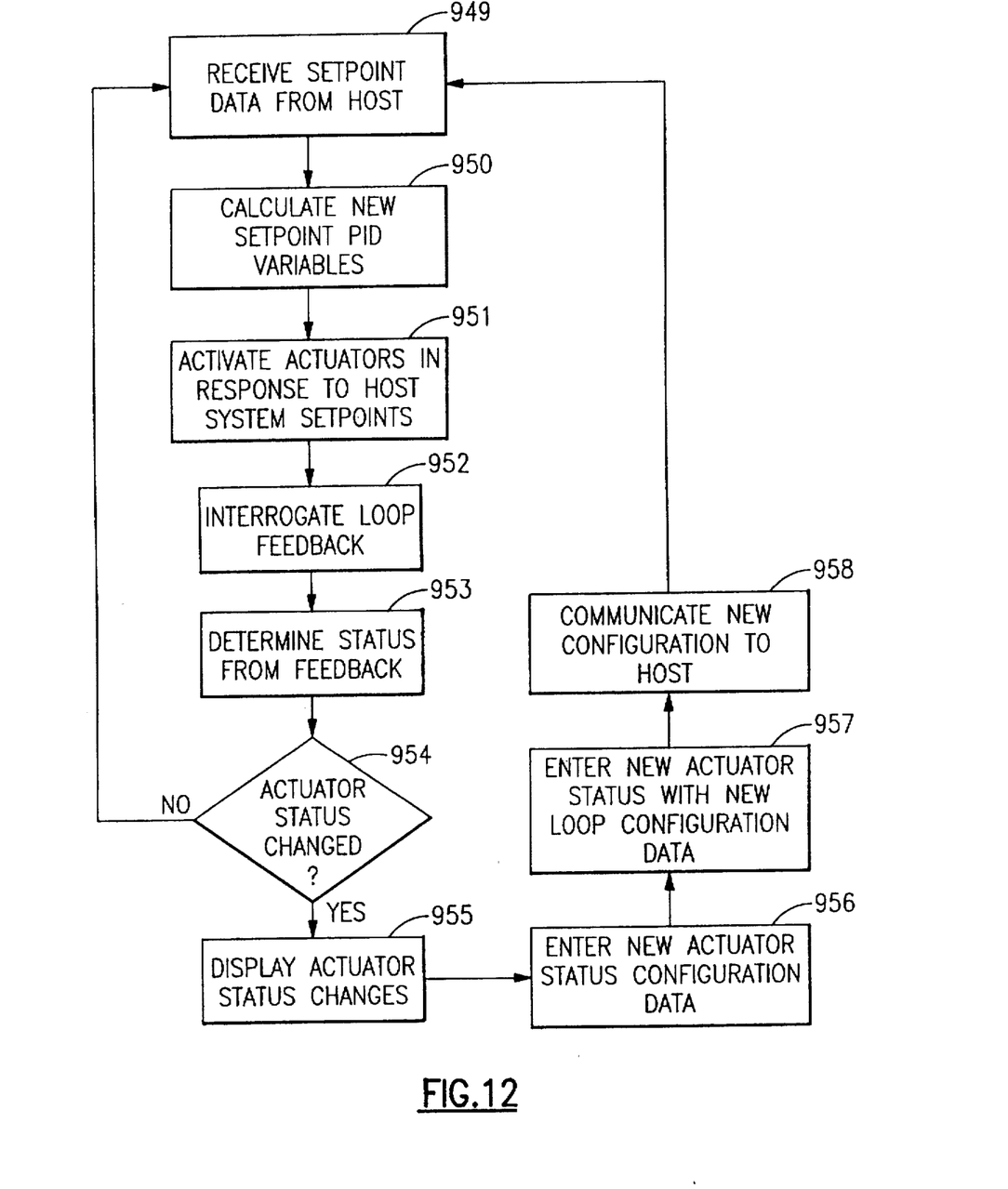
FIG. 12 is a flow diagram of internal node control for operating the present product application control system shown in FIG. 8.

The operation of the product application control system can be understood generally with respect to FIGS. 9-12 which are flow diagrams of a preferred algorithm used to operate the various functional levels of the control system. FIG. 9 is a flow diagram of the system tasks performed by the host during operation. FIG. 10 is a flow diagram of the algorithm which operates the multiple network server start-up. FIG. 11 is a flow diagram of the operation of each network server. FIG. 12 is a flow diagram of internal node control operations. It will be understood that the control system operates simultaneously at each of these levels in a coordinated manner.

As seen in FIG. 9, the host operating system is booted up at step 920. An expert system is also started at this time. The expert system is the artificial intelligence device which processes all of the complex calculations associated with the control of product application. It is a system defined by the use of one or more relationships between one or more factors that relate to crop production. The relationships may be mathematical, spatial, user defined or others; examples include recommendation equations for a given nutrient and crop as published by most state universities. Similar expert systems have been described in the '876 patent to Monson et al. and the '924 patent to Monson et al. The expert system of the present invention performs similar functions. It will be appreciated, however, that in the present multiple network system much of the responsibility for data storage and performance of calculations has been shifted downward to the node level. Therefore, the expert system as contemplated herein may include components within the host as well as the node controllers.

At step 921 an examination of network server applications is made. A determination is made at decision block 922 whether all servers are accounted for. If not, the algorithm loops back to step 921. When all servers are accounted for an examination of all data returned on the network is made at step 923. This data is then analyzed at step 924 to define inputs available, outputs required, and dependencies. The algorithm then proceeds, at step 925, to define setpoints for outputs required at each node based upon the spatial position of the vehicle. In the algorithm shown in FIG. 9, the calculation of setpoints at step 925 assumes that the map resides in the host. As previously discussed with respect to FIGS. 4-7 it is possible to download map information to the nodes or to include map information at both the host and node level. Therefore, depending upon the location of the map data the setpoint calculation may be performed in the host, at the node controller level or some combination thereof.

After the setpoints have been calculated a determination is made at decision block 926 whether independent feedback inputs exist. These independent feedback inputs may consist of the input from one or more sensors which sense data related to plant development. Such sensors may be used to calculate from soil samples taken periodically during the procedure certain characteristics such as nitrogen level, potassium level, phosphorous level, soil type, pH level, soil temperature, and herbicide, pesticide or fungicide levels, for example. These sensors may operate on a continual or intermittent basis to provide data on a real time basis which is used by the control system for updating the data used in product application control. This data may originally be comprised of pre-loaded maps which may then be updated in real time by the sensor data as the product application process proceeds. The information obtained from the sensors is analyzed for validity and, if valid, is utilized to update the existing data to provide the highest degree of accuracy at the present time. If the sensed data is invalid or inconclusive it is not used. In that case the system would utilize existing data. Therefore, even in the case of a sensor failure where no data is forthcoming the system would continue to be as accurate as the existing map data, which means, even in a worst case scenario, that the system is as accurate as those in use today.

If feedback is determined to exist at decision block 926 it is analyzed at step 929 to determine its impact and is communicated to the expert system. If no independent feedback inputs exist or if the feedback information has been analyzed and communicated to the expert system then an examination of network status is made at step 929. The status of the networks is communicated to the expert system at step 928 which then loops back to step 922 to start the process over again.

FIG. 10 is a flow diagram of the algorithm used for the multiple network server start-up. At step 930 the operating system is booted up. At decision block 931 a determination is made of the presence of the network. If the network is not sensed a display of system status is made at step 932. If the network is sensed network feedback is interrogated at step 933. A determination of network status from the feedback is made at step 934 and is displayed at step 935. At decision block 936 a determination is made whether all feedback is accounted for. If not, the algorithm loops back to decision block 931 to repeat the process until all feedback has been accounted for.

When all feedback is accounted for a determination is made at decision block 937 of the existence of multiple networks. If multiple networks are not sensed a single network server is begun at step 939. If multiple networks are sensed multiple independent single network servers are begun at step 938, one for each network on the system.

FIG. 11 is a flow diagram of the algorithm used for the single network server. Preliminary node configuration data is entered at step 940. The configuration data may be comprised of a short piece of code that is sent via the network to each specific node to configure node firmware for operation. The data defines pin assignments, constants, control technique, system variables and reporting requirements, among others. All executable software on the node is transmitted to the node by the host. The process effectively starts the node control software into operation.

At step 941 the status of the node(s) is examined. The nodes are initialized at step 942 according to the node configuration data received from the host. At decision block 943 a determination is made whether all nodes have been initialized. If not, the algorithm loops back to step 941 for the process to continue until the initialization of all nodes has been completed. When the node initialization process is complete the host system requirements are examined at step 944. It is at this step that the setpoints which were calculated at step 925 of the host system tasks algorithm (FIG. 9) are communicated to the network server. The calculated setpoints for the required outputs are utilized to define the node requirements at step 945. The setpoints for the required outputs are communicated to the nodes at step 946. A determination is made at decision block 947 whether setpoint requirements have been communicated to all nodes. If not, the algorithm loops back to step 945 until setpoint communication to all nodes has been completed. Once completed, the system records pertinent network data. This may consist of updating maps or to otherwise provide a current status of system operation.

FIG. 12 is a flow diagram of the algorithm used for internal node control. Setpoint data is received from the host at step 949. This is the data that is communicated by the network server at step 946 of FIG. 11. The setpoint data is used to calculate new setpoint PID variables at step 950. The PID logic is programmed into the node firmware (software resident in the node non-volatile memory). This allows better control than centralized traditional control. Since the processor is located at the site of the control it is required only to maintain the particular node setpoint to which it has been assigned.

At step 951 the actuator is activated in response to host system setpoints. Loop feedback is interrogated at step 952 and the status of the node is determined from the feedback at step 953. At decision block 954 a determination is made whether actuator status has changed. If the status has not changed the algorithm loops back to step 949 to receive additional setpoint data from the host. If the actuator status has changed, for example, as the result of a watch dog alarm known to those of skill in the art, the actuator status change is displayed at step 955. New actuator status configuration data is entered at step 956. At step 957 new actuator status with new loop configuration data is entered and the new configuration data is communicated to the host at step 958. The algorithm then loops back to step 949 to receive new setpoint data from the host.

It is apparent from the foregoing that the multiple-network control system described above may be used to accurately control product application in an accurate and dependable manner.

Distributed Process Management

In one preferred embodiment the present invention includes a distributed process manager which functions as a process distribution controller. The process manager is embedded in the host central processing unit. Through the use of specialized software the process manager is able to monitor the work or activity being performed by the system and to redistribute the work according to the load at which the host CPU is running.

As the size of the control system and the number of nodes and independent networks increases a greater burden is placed upon the host CPU. The size of the system thus dictates that at a certain level the host CPU will exceed its processing capacity and the system will slow down. This could result in delayed control, inaccurate control or even system failure. Recognizing the potential for this problem the present system utilizes a process manager. It is the function of the process manager to monitor the level of processing activity of the host CPU. When the host processing activity exceeds a certain predetermined target level, for example, 30%, the process manager begins to download processing responsibility to the nodes based upon predetermined process priorities. Thus, the processing activity of the host CPU is maintained at or below a desired target level which allows sufficient capacity to free up the host to handle the multitude of communications which are required between different parts of the system in an efficient and timely manner.

Figure 13:
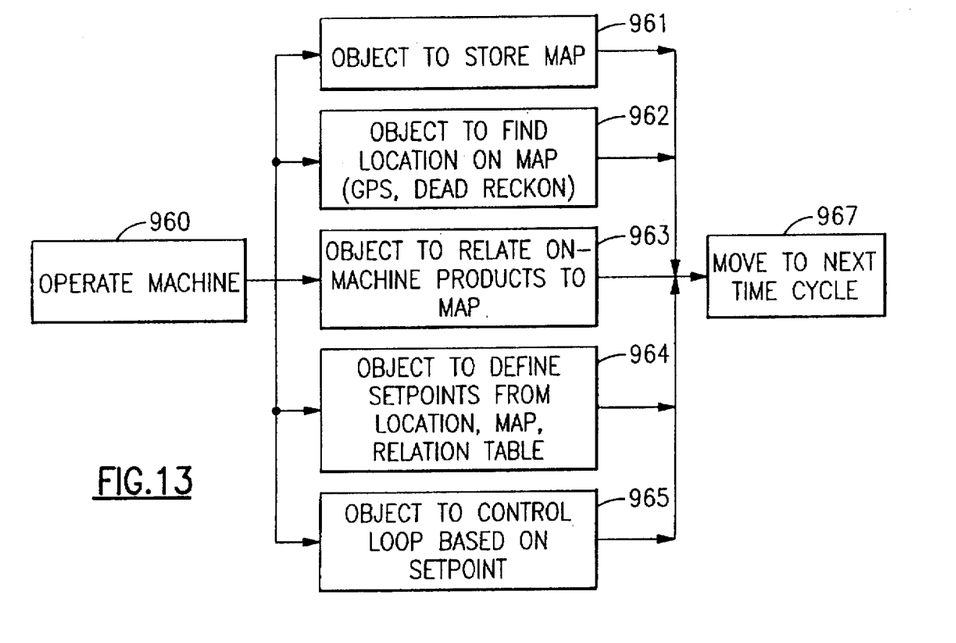
FIG. 13 is a flow diagram of a typical time cycle of the distributed processing system of the present invention.
Figure 14:
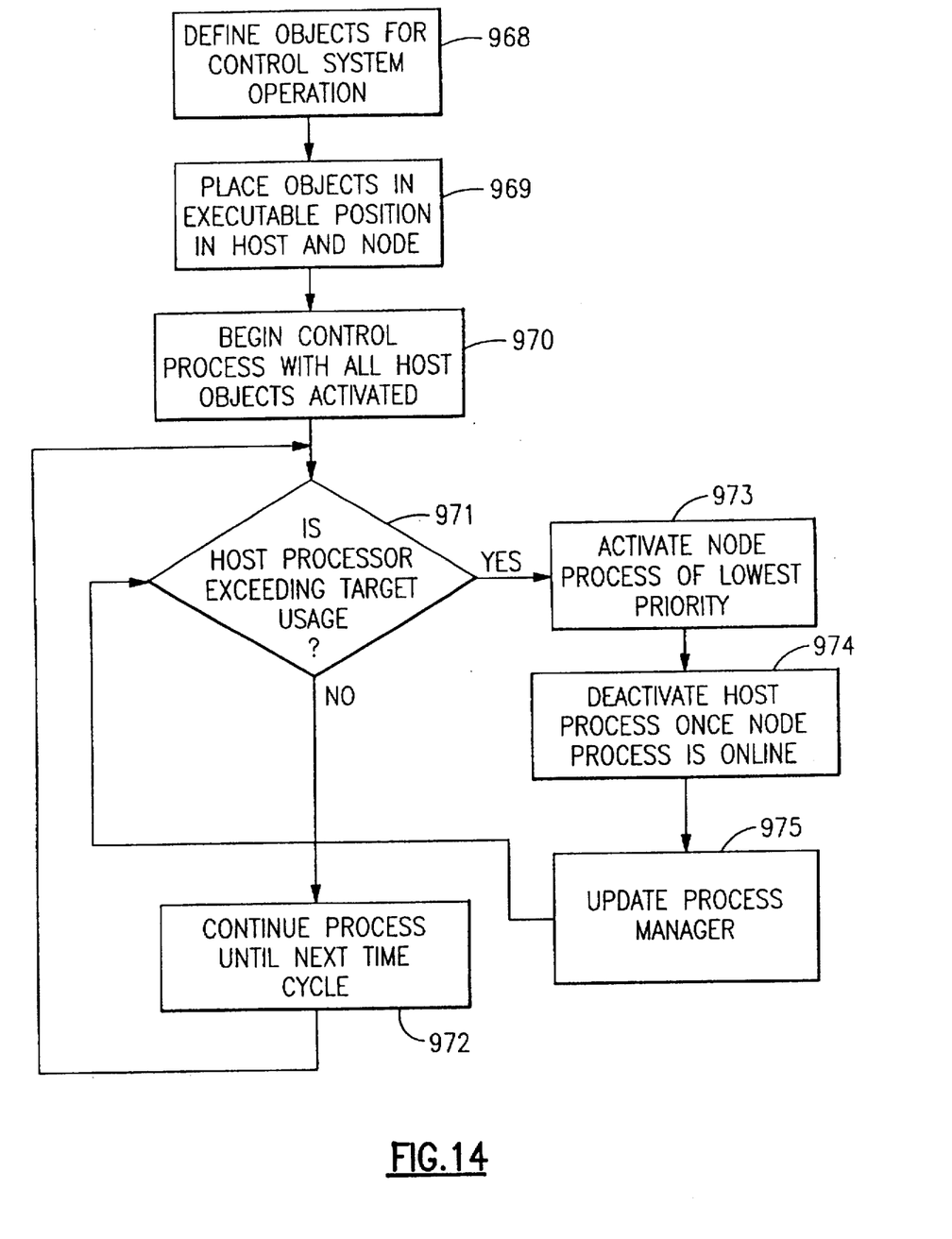
FIG. 14 is a flow diagram of the distributed of the processing of objects between the host system and a single node.

The distributed process manager can be best understood with respect to FIGS. 13 and 14. FIG. 13 is s flow diagram of a typical time cycle of the distributed processing system. FIG. 14 is a flow diagram of the distribution of the processing of objects between the host system and a single node. Box 960 represents the start of a typical time cycle during operation of the control system. Those of skill in the art will recognize that the lower the time cycle of the control system the more accurate the control will be. Preferably, a time cycle under 100 milliseconds is desirable. During each time cycle certain objects are required to be performed. Through the use of object-oriented software it is not necessary that the objects be performed in a top-down manner. Rather, the objects may be performed simultaneously with the order of performance being dependent only upon the interrelationship of the objects being performed. For example, the commencement of a particular object may depend upon the result of another object, each being performed during the same time cycle. In FIG. 13, boxes 961 through 965 represent typical objects to be performed during a typical time cycle. Each object represents an individual program the results of which are communicated between the host and independent control modules through the use of messages. Once the time cycle is complete the system moves to the next cycle represented by box 967.

FIG. 14 is a flow diagram of the distributed process management system of the present invention between the host system and a single node. It will be appreciated that the system functions similarly with respect to each individual node. At box 968 the objects for control systems operation are defined. Those objects are placed in executable position in both the host and the node at box 969. The process begins at box 970 with all host objects being activated. This means that when the system is initially activated the host processes all objects. At decision box 971 a determination is made whether the host processor is exceeding its target usage. For example, the target usage of the total processing capacity of the host CPU may be 30%. Obviously, the target may be varied depending upon system requirements and the desires of the system designer. Since the nodes are constructed with intelligent control modules which are self-sufficient, it is possible to download all of the processing activity to the individual nodes, the host then being utilized only for system communication. Alternatively, the system allows the designer to make primary use of the host and to download processing activity only when an overload situation is being encountered.

If the host processor is not exceeding target usage the process continues at box 972 to the next time cycle with no processing activity being downloaded to the node. At this point the algorithm loops back to decision box 971 at which time another determination is made whether the host processor is exceeding target usage. As long as the target usage is not exceeded this loop will continue and the host processor will continue to process all of the objects. If the host processor is exceeding target usage the process of lowest priority is activated in the node at box 973. This represents the download of processing responsibility for the object of lowest priority to the node. At box 974 the host process is deactivated once the node process is on-line. Thus, the object will be processed by the node and not at the host. At box 975 the process manager is updated. This allows the process manager to keep track of the location of objects such as by hand shake communication. The algorithm then loops back to decision box 971 at the next cycle to determine once again if the host processor is exceeding target usage. Objects will continue to be downloaded to the nodes on the basis of the lowest priority activity until the host processor reaches a level that does not exceed target usage.

Such a distributed process manager is ideal for use with a control system having multiple independent networks, each including one or more independent intelligent nodes. Since the system allows processing requirements to be downloaded to the node level the host CPU is able to efficiently perform as a communication manager between the various parts of the control system. Such a system provides opportunity for use of multiple networks of diverse function. For example, the control system may include a product application control network, a vehicle location sensing network, a chassis control network and/or a product development sensing network for providing data relating to plant development. Each of the networks is capable of operation which is essentially independent of the others but in a coordinated and controlled manner which allows continual communication of relevant data between each separate portion of the system. Such a control system can effectively be used to control not only the application of product but also the vehicle as it travels over the field. In particular, based upon sensed data which may include vehicle speed, engine RPM, transmission status and terrain topography the control system may include various nodes and actuators which control vehicle speed, steering, and transmission gear ratio. The result is that the mobile product application system becomes a generally hands-off system with no active intervention required by the operator. Such a system may be remotely operated or may include an operator present in the vehicle to monitor system status and to assume manual control should it be necessary.

Having thus described the preferred embodiments in sufficient detail to permit those of skill in the art to practice the present invention without undue experimentation, those of skill in the art will readily appreciate other useful embodiments within the scope of the claims hereto attached. For example, although the present invention has been described as useful for the agronomic industry, those of skill in the art will readily understand and appreciate that the present invention has substantial use and provides many benefits in other industries as well. Some of those may include practicing the present invention to spread products such as sand, gravel or salt on roads or highways. In general, the agronomic community would find the present invention useful in applying products such as fertilizers including starter fertilizers, insecticides, herbicides, as well as seeds. It is to be further appreciated that the present invention may apply such products in either liquid or solid form. The invention is also applicable to areas of the agronomic industry in addition to application of products. For example, it is known to be desirable to adjust the depth of tillage equipment in dependence on soil moisture. However, no presently used equipment is able to control tillage depth on a real time basis. By utilizing the control system of the present invention it is possible to use real time data collected by a soil moisture sensor to adjust tillage depth by controlling an actuator(s) which is responsible for depth control. Thus, the present invention is applicable to any situation where it is desirable to control an agronomic input (e.g., product application, tillage depth, etc.) based upon the real time measurement of data related to crop development.

I claim:

1. A mobile product application control system comprising:
   a vehicle;
   at least one distributed network coupled to the vehicle, the at least one distributed network including at least one independent control module having processing capability for controlling at least one actuator device in response to control setpoints generated from objects processed within the control system, such that at least one predetermined product is applied to a predetermined geographic land area at variable rates determined by the control setpoints;
   a central processor coupled to the at least one distributed network, the central processor including a process distribution controller which monitors the level of processing activity of the central processor and is responsive thereto to maintain responsibility of processing objects in the central processor so long as the level of processing activity in the central processor does not exceed a predetermined target level and to download responsibility for processing at least one object to at least one independent control module when the level of processing activity in the central processor exceeds the predetermined target level; and
   at least one data input device coupled to at least one of the distributed network and the central processor, input data from the at least one data input device being used in processing at least one object.

2. The mobile product application control system of claim 1 further comprising a network interface coupled between the central processor and the at least one distributed network for controlling the exchange of information between the central processor and the at least one distributed network.

3. The mobile product application control system of claim 1 further comprising an expert system coupled to the at least one distributed network, the expert system defining the relationships between the input data, those relationships being utilized in processing at least one object to determine a target rate of application of the at least one predetermined product.

4. The mobile product application control system of claim 1 wherein the vehicle is self-propelled.

5. The mobile product application control system of claim 1 wherein the vehicle is equipped for towing.

6. The mobile product application control system of claim 1 wherein the at least one distributed network includes at least one of a product application control network, a vehicle location sensing network, a chassis control network and a product development sensing network.

7. The mobile product application control system of claim 6 wherein the at least one distributed network includes independent control modules controlling actuators responsible for product application, vehicle speed, vehicle gear ratio and vehicle steering.

8. A mobile product application control system comprising:

a vehicle;

at least one actuator device coupled to the vehicle;

independent processing and control means for controlling at least one actuator device in response to control setpoints generated from objects processed within the control system, such that at least one predetermined product is applied to a predetermined geographic land area at variable rates determined by the control setpoints;

at least one network means for distributing the independent processing and control means on a distributed network;

central processing means coupled to the at least one distributed network means, the central processing means including process distribution means for monitoring the level of processing activity within the central processing means and being responsive thereto to maintain responsibility for processing objects in the central processing means so long as the level of processing activity in the central processing means does not exceed a predetermined target level and to download the responsibility for processing at least one object to at least one independent processing and control means when the level of processing activity in the central processing means exceeds the predetermined target level; and data input means for inputting data used in processing at least one object.

9. The mobile product application control system of claim 8 further comprising network interface means for controlling the exchange of information between the central processing means and the at lest one distributed network means.

10. The mobile product application control system of claim 9 further comprising expert system means for defining relationships between the input data, those relationships being utilized in processing at least one object to determine a target rate of application of the at least one predetermined product.

11. The mobile product application control system of claim 8 wherein the vehicle is self-propelled.

12. The mobile product application control system of claim 8 wherein the at least one distributed network means includes at least one of a product application control network, a vehicle location sensing network, a chassis control network and a product development sensing network.

13. The mobile product application control system of claim 12 wherein the independent processing and control means control actuators responsible for product application, vehicle speed, vehicle gear ratio and vehicle steering.

14. A method of controlling application of a product to a predetermined geographic land area comprising:

providing a vehicle having at least one input actuator device operably connected thereto;

providing a central processor;

providing at least one independent processing and control module;

processing objects to determine control setpoints, the objects being processed by the central processor so long as the level of processing activity in the central processor does not exceed a predetermined target level and processing at least one object in at least one independent processing and control module when the level of processing activity in the central processor exceeds the predetermined target level; and controlling the at least one actuator device in response to the control setpoints generated from the processed objects such that at least one predetermined product is applied to a predetermined geographic land area at variable rates determined by the control setpoints.

15. The method of controlling application of a product of claim 14 further comprising controlling the at least one actuator device such that at least one of vehicle speed, vehicle gear ratio and vehicle steering are controlled in response to the control setpoints generated from the objects processed.

* * * * *